Figure 1:
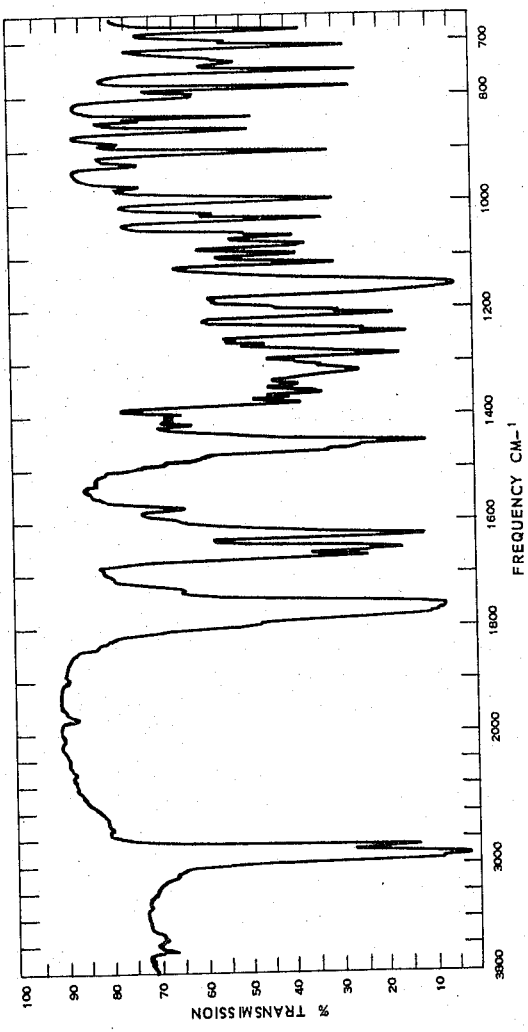

Jan. 24, 1967 M. E. BERGY ETAL 3,300,382
KALAMYCIN AND METHNE FOR PREPARATION
Filed April 1, 1966 2 Sheets-Sheet 1

INFRARED ABSORPTION SPECTRUM OF KALAMYCIN

MALCOLM E. BERGY
JOHN H. COATS
LADISLAV J. HANKA
LEROY E. JOHNSON
INVENTORS

ATTORNEYS

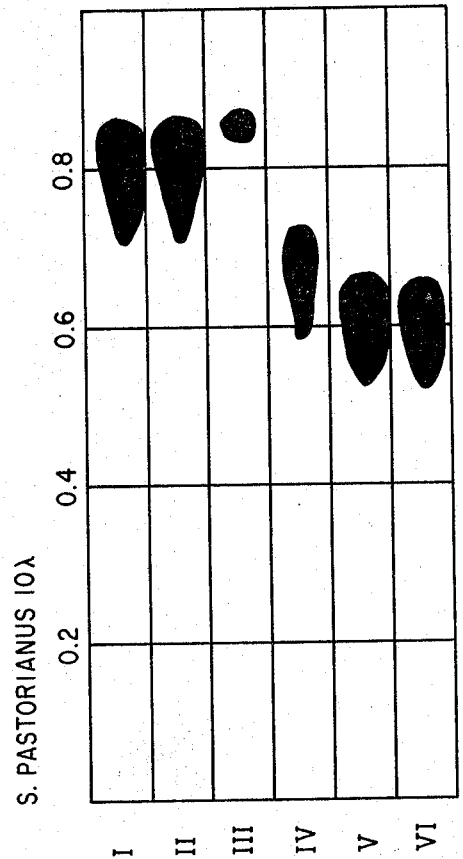
FIGURE 2. PAPERGRAM OF KALAMYCIN

United States Patent Office 3,300,382
Patented Jan. 24, 1967

3,300,382
KALAMYCIN AND METHOD FOR PREPARATION
Malcolm E. Bergy, John H. Coats, Ladislav J. Hanka, and Le Roy E. Johnson, all of Kalamazoo, Mich., assignors to The Upjohn Company, Kalamazoo, Mich., a corporation of Delaware
Filed Apr. 1, 1966, Ser. No. 539,465
10 Claims. (Cl. 167—65)

This invention relates to a novel composition of matter and to a process for the production thereof. More particularly, this invention relates to a new compound, kalamycin (U–19, 718), and to a process for the production thereof.

Kalamycin is a chemical compound which is producible by culturing a kalamycin-producing actinomycete in an aqueous nutrient medium. It is an acidic compound which has the property of adversely affecting the growth of Gram-positive and Gram-negative bacteria, for example, *Staphylococcus aureus, Bacillus subtilis, Streptococcus faecalis, Streptococcus hemolyticus, Diplococcus pneumoniae, Escherichia coli, Proteus vulgaris, Klebsiella pneumoniae, Salmonella schottmuelleri, Pseudomonas aeruginosa, Pseudomonas phaseolicola, Xanthomonas pruni,* and *Erwinia amylovora*. Kalamycin also has antifungal activity against various fungi for example, *Blastomyces dermatitidis, Cryptococcus neoformans, Trichophyton rubrum, Trichophyton violaceum, Trichophyton asteroides, Trichophyton mentagrophytes, Fusarium oxysporum f. cubense,* and *Alternaria solani*. Accordingly, kalamycin can be used along or in combination with other antibiotic agents to prevent the growth of, or reduce the number of bacteria and fungi, as disclosed above, in various environments. For example, it can be used as a disinfectant on various dental and medical equipment contaminated with *Staphylococcus aureus*. It is also useful as an antifungal agent in industrial preservatives, for example, as an antifungal rinse for laundered clothes and for impregnating papers, and fabrics; and it is useful for suppressing the fungal growth of sensitive organisms in plate assays and other biological media. Kalamycin also can be used as a feed supplement to promote the growth of animals, for example, mammals, birds, fish, and reptiles.

CHEMICAL AND PHYSICAL PROPERTIES OF KALAMYCIN

Crystalline kalamycin has the following chemical and physical properties:

Color: orange.
Elemental analyses: C, 63.80; H, 4.07; O, 31.81.
Empirical formula: $C_{16}H_{12}O_6$.
Molecular weight: 288 (titration), 300 (mass spectrometer).
Melting point: 163–166° C.
Ultraviolet absorption spectrum:
  Methanol:
    max. at 212 mu, $a=138.58$
    max. at 256 mu, $a=36.72$
    sh. at 268 mu, $a=35.19$
    max. at 425 mu, $a=14.84$
  .01 N HCl in methanol:
    max. at 212 mu, $a=133.04$
    max. at 256 mu, $a=36.66$
    sh. at 268 mu, $a=34.81$
    max. at 425 mu, $a=14.86$
  Water:
    max. at 213 mu, $a=124.42$
    sh. at 260 mu, $a=37.41$
    max. at 265 mu, $a=37.55$
    max. at 428 mu, $a=13.67$
    max. at 219 mu, $a=110.46$
  .01 N KOH:
    max. at 275 mu, $a=35.97$
    max. at 525 mu, $a=16.58$ Infrared spectrum: The infrared absorption spectrum of kalamycin suspended in mineral oil mull is reproduced in FIGURE 1 of the drawing. Kalamycin shows bands at the following wave-lengths expressed in reciprocal centimeters:

| | |
|---|---|
| 3640 (W) | 1258 (M) |
| 3550 (W) | 1246 (S) |
| 2950 (S) (oil) | 1237 (M) |
| 2920 (S) (oil) | 1211 (S) |
| 2850 (S) (oil) | 1200 (M) |
| 1837 (W) | 1195 (M) |
| 1807 (W) | 1185 (W) |
| 1772 (S) | 1158 (S) |
| 1760 (S) | 1110 (M) |
| 1728 (W) | 1096 (M) |
| 1666 (S) | 1076 (M) |
| 1653 (S) | 1063 (M) |
| 1648 (S) | 1056 (M) |
| 1625 (S) | 1030 (M) |
| 1595 (W) | 1019 (W) |
| 1575 (W) | 993 (M) |
| 1478 (W) | 972 (W) |
| 1458 (M) (oil) | 928 (W) |
| 1452 (S) | 903 (M) |
| 1416 (W) | 890 (W) |
| 1406 (W) | 864 (M) |
| 1399 (W) | 845 (W) |
| 1376 (M) (oil) | 837 (M) |
| 1365 (M) | 802 (W) |
| 1355 (M) | 796 (W) |
| 1340 (M) | 783 (S) |
| 1315 (S) | 753 (S) |
| 1306 (M) | 737 (M) |
| 1298 (M) | 708 (S) |
| 1285 (S) | 698 (M) |
| 1281 (M) | 778 (M) |
| 1265 (M) | 776 (M) |

Band intensities are indicated as "S," "M," and "W," respectively and are approximated in terms of the backgrounds in the vicinity of the band. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale.

Kalamycin has a characteristic papergram pattern as shown in FIGURE 11 of the drawing when using the following solvent systems:

(I) 1-butanol, water (84:16), 16 hours.
(II) 1-butanol, water (84:16), plus 0.25% p-toluenesulfonic acid, 16 hours.
(III) 1-butanol, acetic acid, water (2:1:1), 16 hours.
(IV) 2% piperidine (v./v.) in 1-butanol, water (84:16), 16 hours.
(V) 1-butanol, water (4:96), 5 hours.
(VI) 1-butanol, water (4:96) plus 0.25% p-toluenesulfonic acid, 5 hours.

THE MICROORGANISM

The actinomycete used according to this invention for the production of kalamycin is a newly isolated strain of the known microorganism *Streptomyces tanashiensis*. This newly isolated strain has been designated as *Streptomyces tanashiensis* strain Kala. One of its strain characteristics is the production of kalamycin under the fermentation conditions hereinafter disclosed. A subculture of *Streptomyces tanashiensis* strain Kala can be obtained from the permanent collection of the Northern Utilization Research and Development Division, Agricultural Research Service, U.S. Department of Agriculture, Peoria, Illinois, U.S.A. Its accession number in this repository is NRRL 3215.

The likeness of *Sterptomyces tanashiensis* strain Kala, with the reported description of *Streptomyces tanashiensis* (see Waksman, *The Actinomycetes*, vol. 2, 1961 at page 279) prompted the comparison of the two microorganisms under the fermentation conditions hereinafter disclosed. This testing showed that *S. tanashiensis*, NRRL B–1692, produced kalamycin in amounts sufficient to be detected by paper chromatography. However, the production of kalamycin by any strain of *Streptomyces tanashiensis*, including NRRL B–1692, has not been reported in the prior art.

*S. tanashiensis* strain Kala is melanin positive, has gray to gray-pink aerial growth, and has straight to flexuous sporophores bearing irregular spores that may appear hyaline in the center and dark at the poles by direct examination. It grows best at 18–28° C.

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distiller's solubles, animal peptone liquors, meat and bone scraps, and the like. Combination of these carbon and nitrogen sources can be used advantageously. Trace metals, for example, zinc, magnesium, manganese, cobalt, iron, and the like need not be added to the fermentation media since tap water and unpurified ingredients are used as media components.

Production of the compound of the invention can be effected at any temperature conducive to satisfactory growth of the microorganism, for example, between about 18° and 40° C. and preferably between about 20° and 32° C. Ordinarily, optimum production of the compound is obtained in about 2 to 10 days. The medium normally stays fairly close to neutral, or on the alkaline side during the fermentation. The final pH is dependent, in part, on the buffers present, if any, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an acidic chemical compound having the formula $C_{16}H_{12}O_6$. It is soluble in ethyl acetate, amyl acetate, butyl acetate, and like aliphatic esters; acetone, methyl ethyl ketone, isopropyl butyl ketone, and like lower alkanones; chloroform, methylene chloride, and like halogenated hydrocarbons; and dimethyl sulfoxide. Kalamycin also has a fair degree of solubility in lower alkanols, e.g., methanol, ethanol, isopropanol, the butanols, and the like. It is relatively insoluble in water, cyclohexane and ether.

A variety of procedures can be employed in the isolation and purification of kalamycin, for example, solvent extraction, silica gel chromatography, liquid-liquid distribution in a Craig apparatus, and crystallization from solvents. Solvent extraction procedures are preferred for commercial recovery inasmuch as they are less time consuming and less expensive. Silica gel chromatography is the preferred purification procedure.

In a preferred recovery process, kalamycin is recovered from its culture medium by separation of the mycelia and undissolved solids by conventional means such as by filtration or centrifugation. The antibiotic is then removed from the filtered or centrifuged broth by extraction. For the extraction of kalamycin from the filtered broth, solvents in which it is soluble, as disclosed above, can be used. Methylene chloride is the preferred extraction solvent. The extract obtained by methylene chloride extraction can be concentrated in vacuo to an aqueous solution, which in turn can be freeze-dried to provide the crude antibiotic directly. This preparation can be used in environments where higher purity of the antibiotic is not necessary.

Kalamycin can be extracted from filtered fermentation beer at pH's from about 5.0 to 7.0. At aqueous pH's of about 10.0 and greater, kalamycin does not extract appreciable into the above solvents in which it is soluble. Using this property, kalamycin can be extracted at a pH less than 9.0 into one of the above solvents in which it is soluble. It can then be back-extracted into water at a pH greater than 10.0, and then re-extracted at a pH less than 9.0 into a solvent in which it is soluble. The final extract can then be concentrated to dryness to provide a crude preparation of kalamycin.

Alternatively, kalamycin can be separated from the culture medium by use of a strongly basic anion exchange resin. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex 1, Dowex 2, Dowex 3, Amberlite IRA–400, Duolite A–102, and Permutit S–1.

As a further alternative, kalamycin can be recovered from the filtered culture medium or the organic extract by adsorption techniques, employing such adsorbents as silicic acid, decolorizing carbon or decolorizing resin (a suitable decolorizing resin in Permutit DR, U.S. Patent 2,702,263), alumina and Florisil (a synthetic silicate of the type described in U.S. Patent 2,393,625 and sold by the Floridin Co.). The adsorbed antibiotic can be removed from the adsorbent in relatively pure form by elution with a suitable organic solvent, e.g., one of those mentioned above in which kalamycin is soluble.

High purity kalamycin can be obtained by subjecting an impure dry preparation of kalamycin, as described above, to silica gel chromatography and crystallization using solvents such as ethyl acetate and cyclohexane to develop the column. Fractions obtained from silica gel chromatography can be concentrated to obtain crystalline kalamycin.

Salts of kalamycin are formed employing the free acid of kalamycin and an inorganic or organic base. The kalamycin salts can be prepared, as for example, by dissolving kalamycin free acid in water, adding a dilute base until the pH of the solution is about 10.0 to 11.0 and freeze-drying the solution to provide a dried residue consisting of the kalamycin salt. Kalamycin salts which can be formed include the sodium, potassium, and calcium salts. Other salts of kalamycin, including those with organic bases, such as primary, secondary, and tertiary monoamines as well as with polyamines, also can be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like; phenylalkylamines such as adrenaline, ephedrine, and the like; choline, and others. Salts of kalamycin can be used for the same biological purposes as the free acid.

Kalamycin has a broad antibacterial spectrum as shown in Table I. The antibacterial spectrum was determined by using a tube dilution assay procedure with the media being BHI (Brain Heart Infusion Broth, Difco, Detroit, Michigan). Assay tubes (18 x 150 mm.) were prepared in the customary manner as set out in Snell, E. E., Vitamin Methods, vol. I, Academic Press, Inc., New York, 1950, p. 327. Test organisms, grown for 18 hours at 37° C., were used to inoculate the test medium. The assays were read at 20 hours.

*Table I.—Antibacterial activity of kalamycin*

| Test organism: | Minimum inhibitory concentration in mcg./ml. |
|---|---|
| Staphylococcus aureus | 2 |
| Streptococcus hemolyticus | 16 |
| Streptococcus faecalis | 4 |
| Escherichia coli | 250 |
| Proteus vulgaris | 125 |
| Klebsiella pneumoniae | 250 |
| Salmonella schottmuelleri | 125 |
| Pseudomonas aeruginosa | 125 |
| Bacillus subtilis | 1 |
| Diplococcus pneumoniae | 1 |

Kalamycin has antifungal activity as shown in Table II. The antifungal spectrum was determined by agar dilution plate assay.

*Table II.—Antifungal activity of kalamycin*

| Test organism: | Minimum inhibitory concentration in mcg./ml. |
|---|---|
| Nocardia asteroides | 1 |
| Coccidiodes immitis | 1 |
| Blastomyces dermatitidis | 1 |
| Geotrichum sp. | 10 |
| Hormodendrum compactum | 1 |
| Phialophora verrucosa | 10 |
| Histoplasma capsulatum | 1 |
| Cryptococcus neoformans | 1 |
| Sporotrichum schenckii | 10 |
| Monosporium apiospermum | 10 |
| Trichophyton rubrum | 1 |
| Candida albicans ABBOTT | 10 |
| Trichophyton violaceum | 10 |
| Trichophyton interdigitale | 10 |
| Trichophyton asteroides | 10 |
| Trichophyton mentagrophytes | 10 |
| Saccharomyces pastorianus | 8 |

Kalamycin also has antiprotozoal activity in that it inhibited the protozoans *Ochromonas danica* and *Tetrahymena pyriformis* on in vitro tests. Kalamycin was placed on 12.7 mm. paper discs which were then spotted on agar trays previously seeded with the test organisms. The trays were incubated at room temperature and readings made at 24 hours.

The new compound of the invention, kalamycin, is active against *Bacillus subtilis* and can be used to minimize or prevent odor in fish and fish crates caused by this organism. It can also be used for treating breeding places of silk worms to prevent or minimize infections caused by this organism. Also, since kalamycin is active against *Cryptococcus neoformans*, it can be used to treat pigeon roosts to inhibit this fungus which has been found in pigeon droppings. (Journal of the American Medical Association, vol. 191, No. 4, January 25, 1965, pages 269–274.) The novel compound of the invention can also be used as the antifungal agent in the shoe uppers disclosed in U.S. Patent 3,130,505. Furthermore, the novel antibiotic of the invention can be used to swab laboratory benches and equipment in a mycological laboratory.

Kalamycin can be used to control and eradicate various fungi and bacteria pathogenic to plants and their fruits. For example, kalamycin can be used to control and eradicate early blight of potato which is caused by *Alternaria solani*; diseases of roses and blight of pears and apples caused by *Erwinia amylovora*; black spot on plums, apricots, and peaches caused by *Xanthomonas pruni*; halo blight of beans caused by *Pseudomonas phaseolicola*; and, Panama disease of bananas (banana wilt) caused by *Fusarium oxysporum f. cubense*.

The following examples are illustrative of the process and products of the present invention, but are not to be construed as limiting. All percentages are by weight and all solvent mixture proportions are by volume unless otherwise noted.

*Example 1*

A. FERMENTATION

A soil stock of *Streptomyces tanashiensis* strain Kala, NRRL 3215, was used to inoculate a series of 500-ml. Erlenmeyer flasks, each containing 100 ml. of sterile seed medium consisting of the following ingredients:

| | G./liter |
|---|---|
| Glucose monohydrate | 25 |
| Pharmamedia [1] | 25 |
| Tap water q.s. | Balance |

[1] Pharmamedia is an industrial grade of cottonseed flour produced by Trader's Oil Mill Company, Fort Worth, Texas.

The flasks were grown for three days at 28° C. on a Gump rotary shaker operating at 250 r.p.m.

Seed inoculum, described above, was used to inoculate a series of 500-ml. Erlenmeyer flasks, each containing 100 ml. of sterile fermentation medium. The inoculation rate was 5 ml. of seed inoculum per 100 ml. of fermentation medium. The fermentation medium consisted of the following ingredients:

| | G./liter |
|---|---|
| Glucose monohydrate | 25 |
| Wilson's Peptone Liquor No. 159 [1] | 5 |
| Calcium carbonate | 5 |
| Tap water q.s. | Balance |

[1] Wilson's Peptone Liquor No. 159 is a preparation of hydrolyzed proteins of animal origin.

The pH of the fermentation medium is adjusted to 7.2 with an aqueous solution of sodium hydroxide.

The inoculated fermentation flasks, described above, were incubated for 5 days at a temperature of 32° C. on a Gump rotary shaker operating at 250 r.p.m.

The antibiotic titer of the fermentation beers were monitored by use of a disc plate assay using the microorganism *Saccharomyces cerevisiae*. *S. cerevisae* is inoculated into the assay agar of the following composition:

| | G./liter |
|---|---|
| Dextrose | 30 |
| Yeast extract (Difco) | 7 |
| $KH_2PO_4$ | 5 |
| Agar | 20 |
| Distilled water q.s. | Balance |

Petri dishes are poured and a 12.7 mm. paper disc is placed upon the solidified agar. An 0.08 ml. aliquot of the kalamycin preparation is applied, and the zone of inhibition of growth is determined after incubation for eighteen hours at 28° C.

The activity is expressed in terms of biounits. A biounit (BU) is defined as the concentration of the antibiotic which gives a 20 mm. zone of inhibition under the standard assay conditions. Thus, if for example a fermentation beer has to be diluted $\frac{1}{100}$ to give the 20 mm. zone of inhibition, the potency of such beer is 100 BU per ml.

The above assay procedure also can be used with the microorganism *S. pastorianus* in place of *S. cerevisiae*.

A shake flask fermentation of kalamycin, as described above, assayed 5.7 biounits against *S. cerevisiae*.

B. RECOVERY

The whole beer (100 ml.) from a kalamycin fermentation, as described above, was slurried with 5% of its weight of diatomaceous earth and filtered. The cake was washed with one-tenth volume of water and the wash water added to the filtered beer. The filtered beer plus wash was extracted with ethyl acetate. The ethyl acetate extract was concentrated to an aqueous mixture and freeze-dried to yield an impure preparation of kalamycin. The recovery process, described above, gave the following balance sheet:

| Steps | Amount | Assay (*S. cerevisiae*) |
|---|---|---|
| Whole beer | 100 ml | 1.0 biounits/ml. |
| Clear beer | 100 ml | 0.95 biounits/ml. |
| Ethyl acetate extract | 95 ml | 1.10 biounits/ml. |
| Freeze-dried extract of kalamycin | 16 mg | 5.2 biounits/mg. |

C. PURIFICATION (1) Silica gel chromatography.

An impure preparation of kalamycin, as obtained by a process as described above, was purified on a silica gel chromatography column. The column was prepared in the following manner:

A 5 kg. quantity of silica gel (silica gel number 7734 E. Merckag-Darmstadt, 0.05–0.20 mm. for chromatography) was mixed with 4.0 liters of an aqueous solution containing 136.0 grams of $KH_2PO_4$ and 142.0 grams of $Na_2HPO_4$. The excess water was removed by evaporation, and the buffered gel was activated at a gel temperature of 120–130° C. for approximately 2 hours and cooled to room temperature. The cooled buffered gel was slurried with a sufficient amount of cyclohexane to provide a pourable mixture which was also fluid enough in consistency to allow the escape of air pockets. This mixture was poured into a four-inch I.D. glass column and packed to a constant height of 45 inches using 3–4 pounds per square inch air pressure.

An impure preparation of kalamycin, 564.5 grams, was dissolved in one liter of acetone. The acetone solution of antibiotic was then mixed with one kilogram of buffered and activated silica gel, prepared as above. The acetone was removed by evaporation at room temperature and the dried silica gel mixture was distributed evenly into the head of cyclohexane remaining on top of the chromatography column bed. The level of cyclohexane was drained to within a few inches of the starting material. A solvent mixture, composed of ethyl acetate and cyclohexane (10:90), was carefully layered onto the top of the cyclohexane. The flow was started and 20 liters of this mixture was passed through the column and discarded. The wash solvent was replaced by the developing solvent composed of ethyl acetate and cyclohexane (1:3), and 102 liters of this solvent mixture was passed through the column. Fractions were collected from the start of the developer, and designated as liters of effluent. Each fraction was analyzed for kalamycin by saturating 12.7 mm. assay discs with liquid from each fraction, drying the discs and placing them in an agar tray which had been seeded with the microorganism *S. pastorianus*. The fractions which inhibited the organism growth contained kalamycin. Kalamycin was found to be present in fractions 43–98. Fractions 47–58 were collected and cooled. Kalamycin crystals, which formed spontaneously upon cooling the fractions, were removed by filtration, washed with cyclohexane and dried in vacuo to a constant weight of 21.7 grams. This crystalline preparation of kalamycin assayed 143 *S. pastorianus* BU/mg. and had a UV maximum in methanol at 258 mu, $a=34.0$. The mother liquor from the above crystallization was combined with fractions 43–46 and 59–86 from the silica gel chromatography column, and concentrated in vacuo to a volume of approximately 750 ml. Two liters of ethyl acetate were added to the concentrate to dissolve some precipitated material, and the solution was clarified by filtration. Three liters of cyclohexane were added and the solution was concentrated in vacuo to a volume of 2.0 liters and stored overnight at 5° C. Crystals of kalamycin which formed were removed by filtration, washed with cyclohexane and dried in vacuo to a constant weight of 55.5 grams. This preparation of kalamycin assayed 150 BU/mg., (*S. pastorianus* biounits) and had a UV maximum in methanol at 258 mu, $a=37.0$. The mother liquors from this latter crystallization were concentrated in vacuo to a volume of 100 ml. and stored at 5° C. overnight. The crystals which formed were removed by filtration and dried to a constant weight of 6.8 grams. This preparation of kalamycin assayed 160 BU/mg., (*S. pastorianus* biounits) and had a UV maximum in methanol at 258 mu, $a=35.5$.

*Example 2.—The sodium salt of kalamycin*

A solution of kalamycin is contacted with a cation exchange resin which has been generated to the sodium cycle. The resulting salt is then crystallized from the concentrated solution. Alternatively, the salt can be freeze dried to an amorphous powder.

We claim:

1. A composition of matter assaying at least 1 biounit/ml. of kalamycin, a compound which
    (a) is effective in inhibiting the growth of various Gram-negative and Gram-positive bacteria, and fungi; and in its essentially pure crystalline form,
    (b) is soluble in ethyl acetate, amyl acetate, chloroform, methylene chloride, acetone, methyl ethyl ketone; and relatively insoluble in water;
    (c) has the following elemental analyses: C, 63.80; H, 4.07; O, 31.81;
    (d) has a molecular weight of 300 as determined by mass spectrometer;
    (e) has a characteristic infrared absorption spectrum as shown in FIGURE 1 of the accompanying drawing; and
    (f) has a characteristic papergram pattern as shown in FIGURE 11 of the accompanying drawing.

2. The composition of matter of claim 1 in dry form, said composition of matter assaying at least 5.2 biounits/mg.

3. The compound, kalamycin, according to claim 1, in its essentially pure form.

4. The compound, kalamycin, according to claim 1, in its essentially pure crystalline form.

5. A compound selected from the group consisting of kalamycin, according to claim 1, and salts thereof with alkali metals, alkaline earth metals, and amines.

6. The composition of matter of claim 1 in the form of its sodium salt.

7. A process for making the compound defined in claim 1 which comprises cultivating *Streptomyces tanashiensis* strain kala in an aqueous nutrient medium under aerobic conditions until substantial activity is imparted to said medium by production of kalamycin, and isolating kalamycin from the culture medium.

8. A process according to claim 7 which comprises cultivating *Streptomyces tanashiensis* strain Kala in an aqueous nutrient medium under aerobic conditions until substantial activity is imparted to said medium by the production of kalamycin.

9. A process according to claim 7 which comprises cultivating *Streptomyces tanashiensis* strain Kala in an aqueous nutrient medium containing a source of assimilable carbohydrate and assimilable nitrogen under aerobic conditions until substantial activity is imparted to said medium by the production of kalamycin, and isolating the kalamycin so produced.

10. A process according to claim 9 in which the isolation comprises filtering the medium, extracting the resulting filtrate with a water-immiscible solvent for kalamycin, and recovering kalamycin from the solvent extracts.

No references cited.

SAM ROSEN, *Primary Examiner.*

J. GOLDBERG, *Assistant Examiner.*